United States Patent
Skvortsov et al.

(10) Patent No.: US 12,306,837 B2
(45) Date of Patent: May 20, 2025

(54) INTUITIVE DATA RETRIEVAL AND VISUALIZATION WITH LARGE LANGUAGE MODELS AND LOGIC PROGRAMMING

(71) Applicant: Google LLC, Mountain View, CA (US)

(72) Inventors: Evgeny Skvortsov, Kirkland, WA (US); Shayan Mirjafari, Seattle, WA (US); Wei-Ting Liao, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/361,417

(22) Filed: Jul. 28, 2023

(65) Prior Publication Data
US 2025/0036630 A1    Jan. 30, 2025

(51) Int. Cl.
*G06F 16/2455* (2019.01)
*G06F 16/248* (2019.01)

(52) U.S. Cl.
CPC ...... *G06F 16/24564* (2019.01); *G06F 16/248* (2019.01)

(58) Field of Classification Search
CPC .......................... G06F 16/24564; G06F 16/248
USPC ........ 707/694, 706, 722, 736, 748, 769, 770
See application file for complete search history.

(56) References Cited

U.S. PATENT DOCUMENTS

| | | | |
|---|---|---|---|
| 10,594,813 B1 * | 3/2020 | Koehler | H04L 67/146 |
| 2006/0294258 A1 * | 12/2006 | Powers-Boyle | G06Q 30/02 705/1.1 |
| 2014/0108130 A1 * | 4/2014 | Vos | G06Q 30/0246 705/14.45 |
| 2017/0180798 A1 * | 6/2017 | Goli | H04N 21/433 |
| 2017/0308588 A1 * | 10/2017 | Woods | G06F 16/248 |
| 2018/0336202 A1 * | 11/2018 | Jahanbakhsh | G06F 16/248 |

OTHER PUBLICATIONS

Naveed et al., "A Comprehensive Overview of Large Language Models.", arXiv:2307.06435v8. Feb. 20, 2024, 43 pages.
Skvortsov et al., "Virtual People: Actionable Reach Modeling.", Jun. 21, 2019, https://research.google/pubs/virtual-people-actionable-reach-modeling/, retrieved on Feb. 26, 2024, 20 pages.
Zhao et al., "A Survey of Large Language Models,", arXiv:2303.18223v13, Nov. 24, 2023, 124 pages.

* cited by examiner

*Primary Examiner* — Phong H Nguyen
(74) *Attorney, Agent, or Firm* — DORITY & MANNING P.A.

(57) ABSTRACT

The present disclosure is directed to automatically generating estimation reports of an online audience. In particular, the system can include a server having a first dataset with a plurality of dimensions. Additionally, the system can receive, from a client device, a query request to estimate the online audience of the content item. The system can process, using a first machine-learned model, the query request to generate a configuration file associated with the first dataset. Moreover, the system can present, on a user interface of a client device, the configuration file. Furthermore, the system can receive a user input in response to the presentation of the configuration file and retrieve data from the first dataset based on the configuration file and the user input. Subsequently, the system can generate, using the first machine-learned model, the report based on the retrieved data from the first dataset.

20 Claims, 9 Drawing Sheets

INTUITIVE DATA RETRIEVAL AND VISUALIZATION WITH LARGE LANGUAGE MODELS AND LOGIC PROGRAMMING

FIELD

The present disclosure relates generally to large language models (LLMs) and logic programming. More particularly, the present disclosure relates to using LLMs and logic programming for retrieving data and generating accurate visualization based on the retrieved data.

BACKGROUND

A computer can execute instructions to generate outputs provided some input(s) according to a parameterized model. The computer can use an evaluation metric to evaluate its performance in generating the output with the model. The computer can update the parameters of the model based on the evaluation metric to improve its performance. In this manner, the computer can iteratively "learn" to generate the desired outputs. The resulting model is often referred to as a machine-learned (ML) model.

The term hallucination in the context of artificial intelligence (AI) refers to an AI system producing outputs or responses that are not based on actual data but are instead generated based on internal biases or misconceptions. It is an issue that arises when a machine-learned model generates information or predictions that are misleading or completely fictional.

Hallucination can occur in various AI systems, including language models, image generation models, and other generative models. The problem often arises when the AI model has encountered unfamiliar input or is generating outputs beyond the scope of its training data. In language models, for example, hallucination can manifest as the AI generating responses that seem plausible on the surface but are not supported by factual evidence.

Hallucination is a significant challenge in AI development, especially when deploying AI systems in critical applications such as decision-making. AI developers need to address the issue to prevent AI systems from generating misleading outputs due to hallucination. Ensuring that AI models are reliable, interpretable, and aligned with real-world data is essential for building trustworthy AI systems.

SUMMARY

Aspects and advantages of embodiments of the present disclosure will be set forth in part in the following description, or can be learned from the description, or can be learned through practice of the embodiments.

One example aspect of the present disclosure is directed to a computing system configured to generate a report estimating an online audience of a content item. The computing system can include one or more processors and a server having a first dataset. The first dataset can have a plurality of dimensions. The computing system can include one or more computer-readable media that store computer-readable instructions that, when executed by the one or more processors, cause the computing system to perform operations. The operations can include receiving, from a client device, a query request to estimate the online audience of the content item. Additionally, the operations can include processing, using a first machine-learned model, the query request to generate a configuration file associated with the first dataset. The configuration file can have a first dimension from the plurality of dimensions. Moreover, the operations can include presenting, on a user interface of a client device, the configuration file. The operations can include receiving a user input in response to the presentation of the configuration file. Furthermore, the operations can include retrieving data from the first dataset based on the configuration file and the user input. Subsequently, the operations can include generating, using the first machine-learned model, the report based on the retrieved data from the first dataset.

In one example, the user input can change the configuration file. In this example, the system can update the configuration file based on the user input. Additionally, the system can compile the updated configuration file into a logic programming rule. The logic programming rule can have a predicate. The predicate can be associated with the first dimension. Moreover, the system can compile the logic programming rule into a database query of the server. The report can be generated based on data retrieved from the first dataset using the database query. The data retrieved can be filtered based on the first dimension.

In some instances, the user input can change a parameter of the first dimension in the configuration file.

In some instances, the user input can change the first dimension in the configuration file to a second dimension.

In one example, the user input can be a confirmation that the configuration file is accurate. In this example, the system can compile the configuration file into a logic programming rule, the logic programming rule having a predicate. The predicate can be associated with the first dimension. Additionally, the system can compile the logic programming rule into a database query of the server, wherein the report is generated based on data retrieved from the first dataset using the database query. Moreover, the data retrieved can be filtered based on the first dimension.

In some instances, the first dimension can be a date or a range of dates (e.g., the last 30 days). In some instances, the first dimension can be a device type. In some instances, the first dimension can be a country.

In some instances, the first machine-learned model being can be configured to process the configuration file to generate the report concurrently while presenting the configuration file on the user interface of the client device.

In some instances, the structured configuration file can include a predicate associated with the first dimension and a measure. For example, the measure is an impression of a content item. In another example, the measure is a reach measurement associated with a content item.

In some instances, the report can be a line chart, a pie chart, or a table.

In some instances, the server can include a plurality of datasets. The operations can include determining, using the first machine-learned model, to retrieve data from the first dataset in the plurality of dataset based on the query request.

In some instances, the computing system includes a plurality of machine-learned models. The operations can include selecting the first machine-learned model from the plurality of machine-learned models based on the query request. Additionally, the operations can include selecting a second machine-learned model from the plurality of machine-learned models based on the query request. Moreover, the operations can include generating, using the second machine-learned model, a second report based on the retrieved data. Furthermore, the operations can include presenting, on the user interface of the client device, a comparison of the report and the second report.

In some instances, the configuration file can include a parameter associated with the first dimension, wherein the data retrieved from the first dataset is filtered based on the parameter associated with the first dimension.

Another example aspect of the present disclosure is directed to a computer-implemented method for generating a report. The method can include receiving, by one or more computing devices, a query request. Additionally, the method can include processing, using a first machine-learned model, the query request to generate a configuration file associated with a first dataset. The configuration file can include a first dimension from a plurality of dimensions. Moreover, the method can include presenting, on a user interface of a client device, the configuration file. The method can include receiving a user input in response to the presentation of the configuration file. Furthermore, the method can include retrieving data from the first dataset based on the configuration file and the user input. Subsequently, the method can include generating, using the first machine-learned model, the report based on the retrieved data from the first dataset.

Another example aspect of the present disclosure is directed to one or more non-transitory computer-readable media comprising instructions that when executed by one or more computing devices cause the one or more computing devices to perform operations. The operations can include receiving, from a client device, a query request to estimate the online audience of the content item. Additionally, the operations can include processing, using a first machine-learned model, the query request to generate a configuration file associated with the first dataset. The configuration file can have a first dimension from the plurality of dimensions. Moreover, the operations can include presenting, on a user interface of a client device, the configuration file. The operations can include receiving a user input in response to the presentation of the configuration file. Furthermore, the operations can include retrieving data from the first dataset based on the configuration file and the user input. Subsequently, the operations can include generating, using the first machine-learned model, the report based on the retrieved data from the first dataset.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
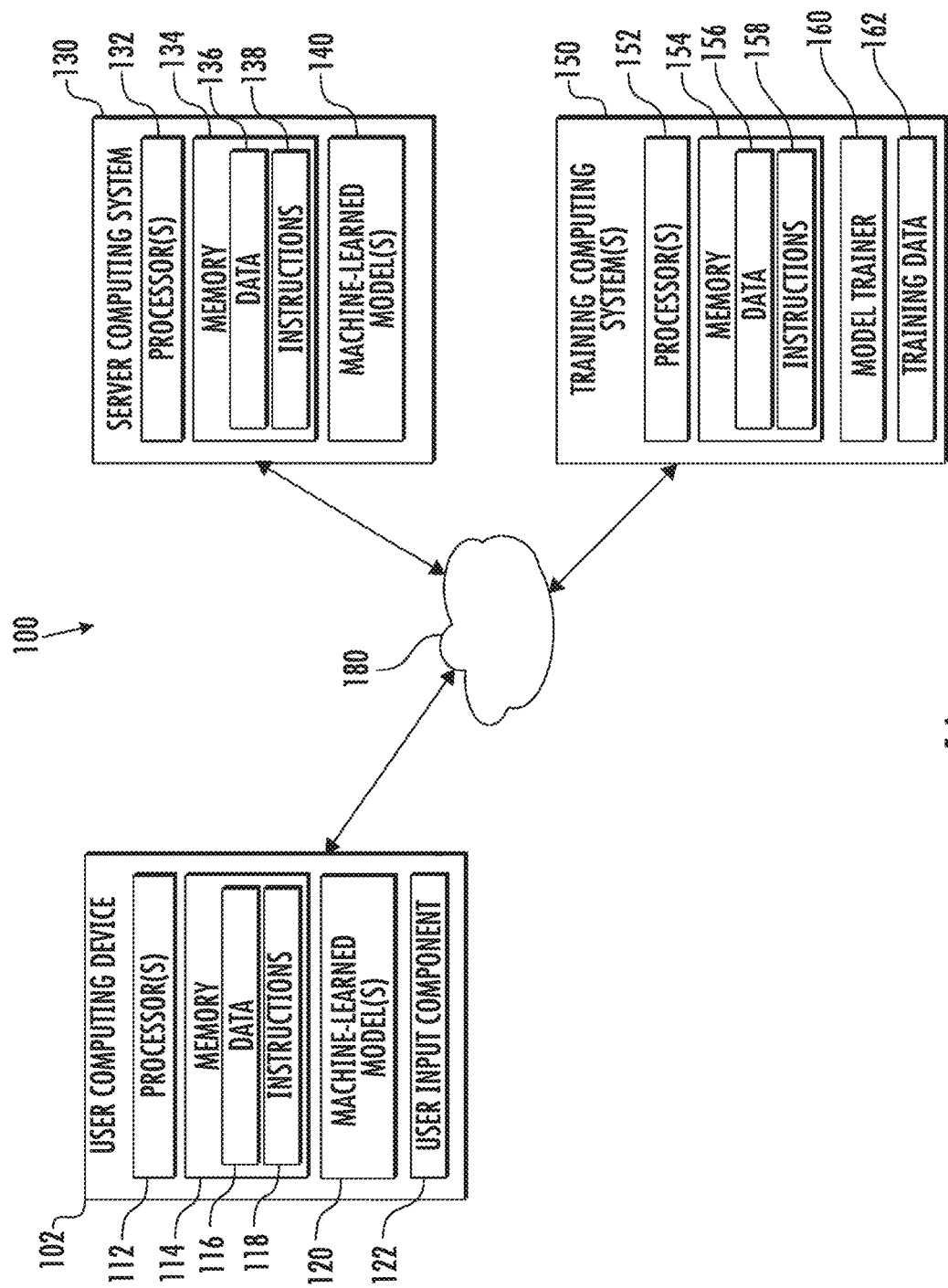
FIG. 1A depicts a block diagram of an example computing system that performs operations to automatically generate a report according to example embodiments of the present disclosure.

Reference numerals that are repeated across plural figures are intended to identify the same features in various implementations.

DETAILED DESCRIPTION

Overview

Generally, the present disclosure is directed to improve the accuracy of estimation reports by using machine-learning models (e.g., language models) that have an intermediate representation being verified or modified by a user input. The intermediate representation can be presented to a user during an intermediate stage of performing the report generation.

The system described herein can provide insights about large volumes of data to users who are not necessarily proficient in data analysis and nuances of data structures used in the representation. For example, the system can generate reports that enable reach metrics to be more widely accessible and useful. Reach measurement can be a count of unique users in a web audience that can be determined using a reach model.

Reach measurement, which can determine a number of unique users viewing a content item (e.g., advertisement) can be a fundamental metric of brand marketing. An entity (e.g., advertiser) can run a marketing campaign on different platforms (e.g., television, mobile devices) and may want to determine the number of unique users in a specific country that viewed the content item. The entity may have a wide variety of questions, such as the total reach of a campaign, the total number of impressions of a campaign, the reach breakdown by devices, how has the reach changed over time, how many people did I reach on each device type in a first country, and so on. The variety of questions can be extremely large, and there can be a variety of solutions shown by data visualization. In conventional systems, reach calculations can be obtained using a plurality of user interfaces (UIs), where each UI has its own data querying approach, where the operations are generally performed by data engineers that are proficient in the data structures of each database. However, with conventional systems, it can be complicated to navigate between the different UIs to obtain specific reach calculations. The answers to the user request are typically obtained by software engineers or data scientists that interface with complicated user interfaces to obtain the correct data from the databases. The user interfaces may be too complicated or complex for users without the proper training to interface with the databases.

With the emergence of natural language processing such as large language models (LLMs), meaningful improvements have been made to make it easier for users to explore large volumes of data, such as determining reach measurements. However, there is a risk of hallucination, and the output data from the machine-learned models may be incorrect. A user may not know that the output data is incorrect, nor will the user be able to figure out the mistake that resulted in the incorrect output.

Techniques described herein enable easier data exploration by creating a framework that receives a user request, such as a user asking nature language questions. The system, empowered by a language model (e.g., large language model), can parse the user request into an intermediate representation. The intermediate representation can be a configuration file (e.g., structured configuration file) that is presented to the user to review, edit, and/or confirm. The configuration file can have dimensions, measures, and filters associated with the database and the user request. Additionally, the system can retrieve data based on the configuration file, and perform visualization based on the retrieved data. Moreover, the system can configure the database using meta-configuration, and apply logic programming to a specific data set in the database for the data retrieval. In conventional systems, programming language (e.g., Python, Structured Query Language (SQL)) is used to query a database.

Figure 5:
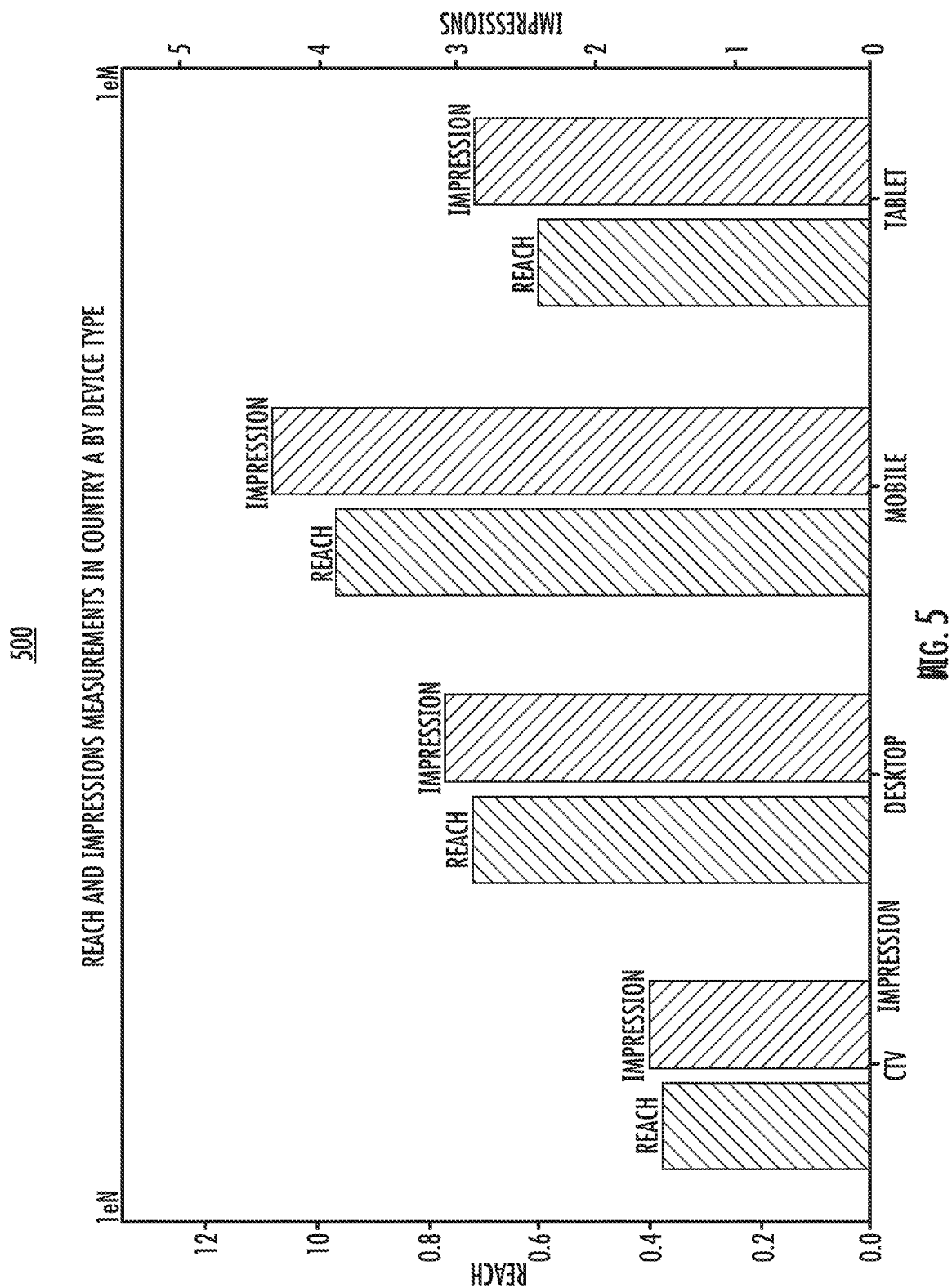
FIGS. 5-7 depict visual representation of the machine-learned model outputs according to example embodiments of the present disclosure.

For example, the user request can be "how many users has the content item reached on each device type in Brazil?" The system can access a first dataset associated with events of users seeing the content item. The first dataset can include a table where each row is an event of the user seeing the content item once, and characteristics (country, device type, time of day, specific location within the country) associated with the event. The system can generate a structured configuration file to retrieve data from the first dataset with "Brazil" as a filter. Additionally, the configuration file can include device type as a dimension. Once the user confirms the configuration file, the system can break down these events in Brazil by device type, and reach can be the measurement. For every value of the dimension (e.g., device type), the system can determine (e.g., count) distinct users. Subsequently, the system can choose a preferred visual representation from a plurality of visual representation for the user request. In this example, the system can present a bar chart which illustrates the dimensions (e.g., different device type) and measure for every value of each dimension, as depicted in FIG. 5.

The system, using a machine-learned model (e.g., language model), can generate a configuration file (e.g., structured configuration file) based on the user request. The structured configuration file can be an intermediate representation (e.g., format) that can be verified and/or modified by a user via a user input on a user interface. By enabling the user to confirm the configuration file, the likelihood of AI hallucination is reduced because there is a higher likelihood that the error can be detected in the configuration file. Additionally, accountability of the output data can be associated with the user given that the user has confirmed and verified the configuration file. Subsequently, the configuration file can be compiled into a set of logic programming rules. Then, the system can compile the logic programming rule into a database query.

The configuration file enables calculating a measurement (e.g., a measure of reach) using a specific model and/or specific dataset. For example, the configuration file can state that the reach calculation using a first model equals a first equation that retrieves data from a first dataset. Subsequently, the logic programming can be defined based on the first equation associated with data stored in a first dataset.

In some instances, logic programming can have a particular syntax or structure that is different from other types of programming structure, which results in easily and automatically being able to process the configuration file. The building block of logic programming includes the notion of predicate. Logic programming predicate enables the integration of both functions and tables that can be configured based on a specific dataset. In contrast, regular programming has functions that perform the calculations and tables that store the data. Given that the functions and tables are combined in logic programming, a logic programming rule can express complex ideas in an intuitive fashion. For example, the logic programming rule can be a reach measurement of a first dataset using a first reach model, which is easy for a person and the system to understand. Additionally, logic programming rules can easily be configured by an engineer. Similar instructions in other computer programming (e.g., Python, SQL) can be achievable, but would be much less intuitive for a user to understand.

According to some embodiments, the configuration file, which is generated based on the query request (e.g., user request), can be edited with user input. For example, the configuration file can be presented to a user on a user interface, and the user can modify the configuration file via the user interface. For example, if the user finds a mistake in the configuration file, the user can edit the configuration file in real-time. Additionally, the system can, in parallel of presenting the configuration file, retrieve the data using the configuration file in order to generate a report for the user request. Moreover, in some instances, as the user updates the configuration file in real-time, the system can update the retrieval process based on the updated configuration file to generate a report based on the updated configuration file.

By presenting the configuration file to the user and allowing the user an opportunity to edit the configuration file, the system provides accountability for the user by giving the user ownership of the configuration file to generate the output. By providing accountability to the user with regards to the correctness of the output, this enables a reduction of AI hallucination.

In some instances, the system can suggest information (e.g., dimensions, variables, measures, filters) for the structured configuration file. For example, based on the user request, the machine-learned model can generate a structured configuration file with prefilled parameters for each dimension, variable, measure, and/or filter. The dimensions, variables, measures, and filters can be interconnected, therefore, when one of the parameters changes based on a user input, the system can automatically update a parameter of another dimension, variable, measure, and filter based on the interconnection as configured by the meta-configuration. The system can generate the parameters all at the same time, which results in the configuration file being a cohesive, understandable config that identifies different aspects of the user request.

By enabling and generating a modifiable configuration file that is generated based on a specific dataset, the system can cover a vast number of diverse questions with regard to a plurality of datasets. Additionally, the configuration file can be different based on the different datasets. The different datasets can be associated with different calculations, such as reach, impressions, internet penetration rate, conversion rate, and so on. The internal structure, as configured by the meta-configuration, can be different for each dataset, thus each dataset can have different dimensions, variables, measures, and filters for the configuration file. The system can automatically generate the configuration file depending on the dataset. The datasets can be configured by defining metrics and queries to extract the metrics, and parameters of the metrics. Subsequently, the prompt to the language model can be generated (a.k.a., prompt engineered) automatically from the structured description of the data source. The language model can generate a configuration file based on the prompt.

In some instances, each dataset in a plurality of datasets can include data with meta-configuration that can be represented with a structured configuration. For example, the structured configuration for calculating reach measure can be [total population, desktop population, mobile population, and so on]. The filters can be based on each dimension. The system, using the language model, can determine which dataset to retrieve the data, and then generate a structured configuration based on the meta-configuration of the determined dataset. The prompt can also be programmatically generated by the system.

Figure 6:
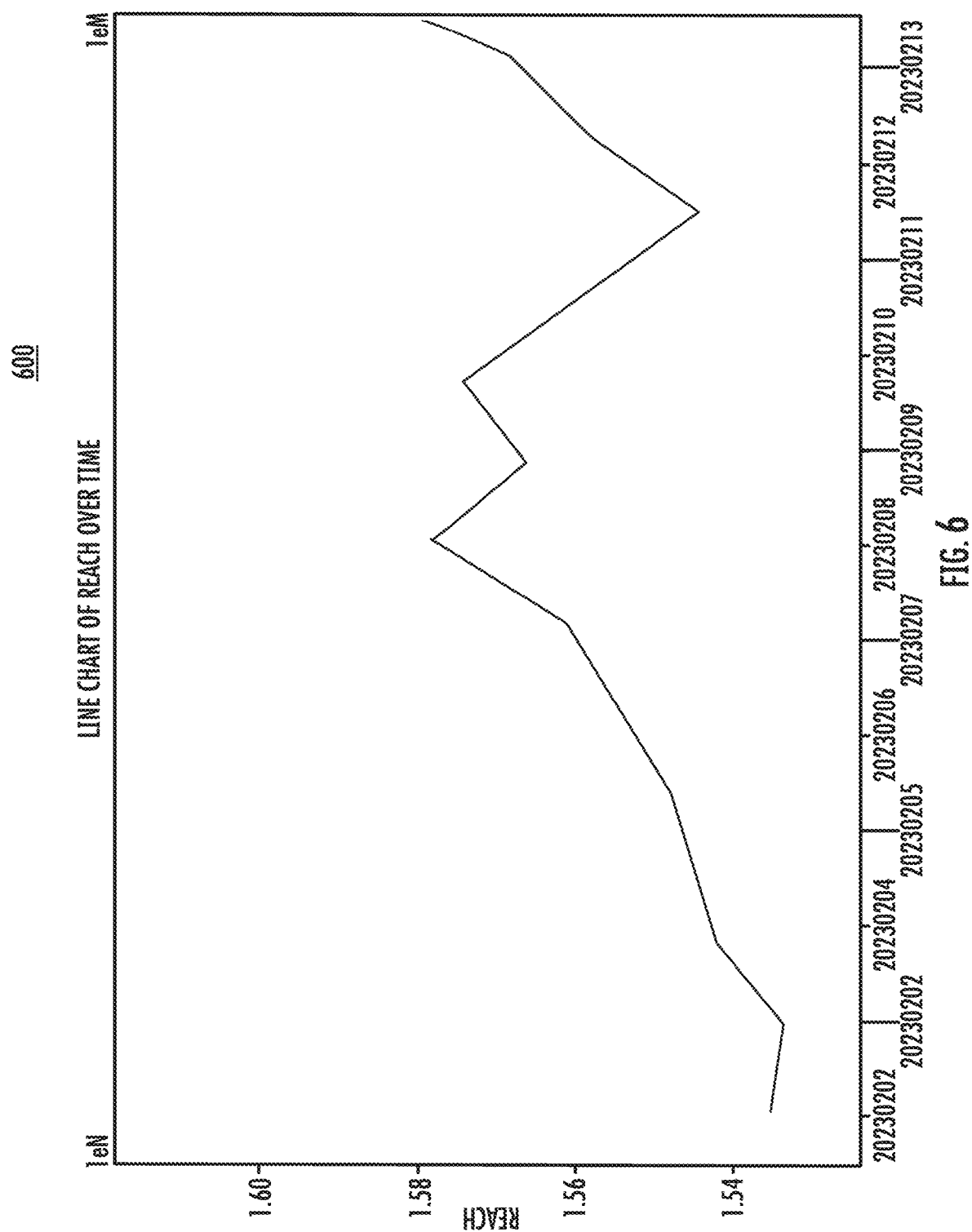
Figure 7:
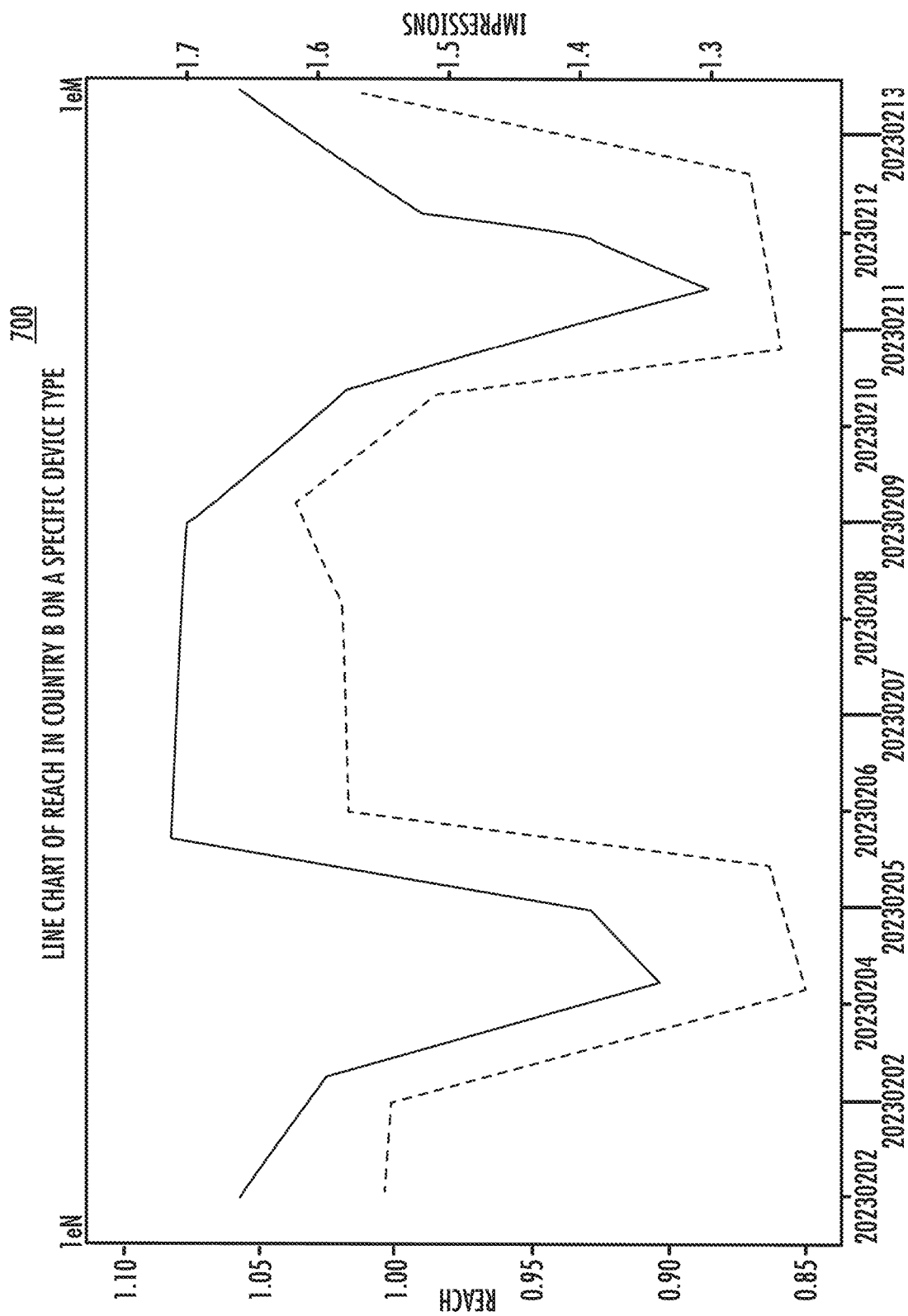

The system can include a server configured to perform retrieval over a specific type of the dataset. For example, a user can ask questions about the data in natural language and receive desired visual representations (e.g., charts, tables) with the answers. Example visual representations are illustrated in FIGS. 5-7.

The server can be configured by writing a meta-configuration, which specifies what dimensions, measures, and filters are available for exploration. The config (i.e., configuration) can also specify which data representations are available. Meta-configuration files can define and manage the configuration of the server efficiently by setting up various software, services, and parameters to meet specific requirements. Meta-configuration files provide a high-level description of the configuration of the server. Additionally, the system can include a user interface that can interpret and automatically generate the necessary configuration files for the server.

As part of the configuration process, the system can define the meta-configuration file format that suits the objectives of the system. For example, the format could be based on a specific syntax or markup language (e.g., JSON, YAML, XML, or a custom DSL (Domain-Specific Language)). Additionally, the system can determine the components and services that need configuration, such as databases, caching systems, and security settings. Each component can have its own block within the meta-configuration file. Moreover, the system can specify configuration parameters. For example, within a section of each component, the system can define the configuration parameters required to set up that component. These parameters can include file paths, authentication credentials, access controls, performance settings. Furthermore, to enhance flexibility and reusability, the system can introduce variables and templates within the meta-configuration file. Variables allow the values to be specified dynamically during the configuration process. Templates enable the reuse of configuration blocks across multiple environments, making it easier to maintain consistency. Subsequently, the system can develop a configuration tool that can read the meta-configuration file and generate the actual configuration files required by each component. The configuration tool can understand the meta-configuration format and has the ability to apply the configurations to the server. The system can run the configuration tool, which can parse the meta-configuration file, resolve variables, and generate the appropriate configuration files for each component. Before applying the configurations to the server, the system can present the configuration files to a user to validate and/or catch any errors or inconsistencies.

Once the configuration files are generated by the system and validated by a user, the system can deploy the configuration files to the server. In some instances, the system can restart or reload the relevant services to apply the new configurations. By using a meta-configuration approach, the system can maintain server configurations in a centralized and easily maintainable format. The system allows for streamlined deployment, version control, and automation of the configuration process, making it more efficient and scalable.

With regards to reach, dimensions can be dates, devices, countries, and so on. Measures can be impressions, reach, reach into certain demo categories, and so on. Filters can include restrictions of dimensions (e.g., restriction to a set of device types, time range). The representations can be line charts, pie charts, tables, and so on.

The system can specify logic predicates that define each dimension, measure and filter. Generality of the notion of predicate in logic programming allows a unified approach to all of those parameters of the configuration.

In logic programming, a predicate can refer to a statement or a condition that defines a relationship between one or more variables. A predicate can consist of a name and a set of arguments. The name represents a label of the predicate, and the arguments are the variables that participate in the relationship defined by the predicate. In some instances, the predicate can represent a logical assertion or a query that can be evaluated to be either true or false. For example, consider the following predicate "parent (mother, son)" In this example, the predicate "parent" has two arguments: "mother" and "son." It asserts that "mother" is the parent of "son." This predicate represents a relationship between individuals in the domain. Predicates can also be used to represent queries in logic programming. For instance, mother (x,y). Here, the predicate "mother" has two arguments, X and Y, and it represents a query to find the value of X that satisfies the condition of being the mother of Y. When executing a logic program, the system will try to find values for X and Y that make the predicate true by exploring different solutions. In logic programming, predicates serve as the basis for defining rules, facts, and queries. The predicate allows the system to express relationships, constraints, and logical operations in a manner that is easy to understand for a user without having to be a data engineer. The execution of a logic program by the system involves evaluating predicates and finding solutions that satisfy the given constraints.

In some instances, the system can implement rendering of the data frame in all of the desired representations.

The technology described herein can provide a number of technical effects and benefits to enhance the inference quality of machine-learning models. For example, as previously indicated, the technology described herein can improve the accuracy of machine-learned model outputs and predictions by utilizing a constraint bottleneck. Additionally, by having a constraint bottleneck, the techniques described herein also make the user accountable for the output of the machine-learned model. Machine-learned models can generate outputs directly from the natural language user request, but by having a constraint bottleneck via the intermediate representation of the configuration file, the system enforces the user to verify the configuration file to ensure that the data retrieved is correct. Moreover, the techniques described herein optimize the number of outputs generated by a machine-learned model by having a user input confirm an intermediate stage (e.g., configuration file) before the machine-learned model generating the output, thus conserving computing resources (e.g., energy, processing cycles, network bandwidth, and/or the like).

Techniques described herein utilize a constraint bottleneck to improve the quality (e.g., accuracy) of the machine-learned model (e.g., language model) inferences and also make the user accountable for the output of the language model. Machine-learned models can generate outputs directly from the natural language user request, but by having a constraint bottleneck via the intermediate representation of the configuration file, the system enforces the user to verify the configuration file to ensure that the data retrieved is correct. The configuration file can be easy to interpret such that a user without specialized training can edit, confirm, and/or verify the configuration file. By improving the quality and accuracy of the machine-learned models, the machine-learned models will generate less output given that first output generated will be accurate and correct. This reduces the likelihood of a user reframing or re-asking a question after the output (e.g., report) has been generated, thus reducing the computing resources requirements of the machine-learned models.

With reference now to the Figures, example embodiments of the present disclosure will be discussed in further detail.

Example Devices and Systems

FIG. 1A depicts a block diagram of an example computing system 100 that performs generating reports in response to a user query according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120 (e.g., language models, LLMs). In some embodiments, a language model can be an example of a machine-learned model. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 2-4.

In some implementations, the one or more machine-learned models 120 can be received from the server computing system 130 over network 180, stored in the memory 114, and then used or otherwise implemented by the one or more processors 112. In some implementations, the user computing device 102 can implement multiple parallel instances of a single machine-learned model 120 (e.g., to perform parallel report generation across multiple instances of user queries).

More particularly, the one or more machine-learned models can be a reach model that is a large language model utilized for estimating reach and demographics of cross-device online audiences. In some instances, the reach model assigns virtual people identifiers to events. The reach of a set of events is estimated as a simple count of distinct virtual people assigned to these events. This allows efficient serving of reach models at large scale. The system can formalize what it means for a reach model to be actionable and prove that any actionable reach model is equivalent to some virtual people model. The system includes algorithms for encoding reach models with virtual people and utilizes a wide variety of modeling techniques to implement this approach.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service. Thus, one or more machined-learned models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the machined-learned models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. In some embodiments, the training computing system(s) 150 can be a plurality of training computing systems which enables the machine-learned models 120, 140 to be trained from a plurality of different systems. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, user input received in response to the presentation of the intermediate representation received during the intermediate stage.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP. FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
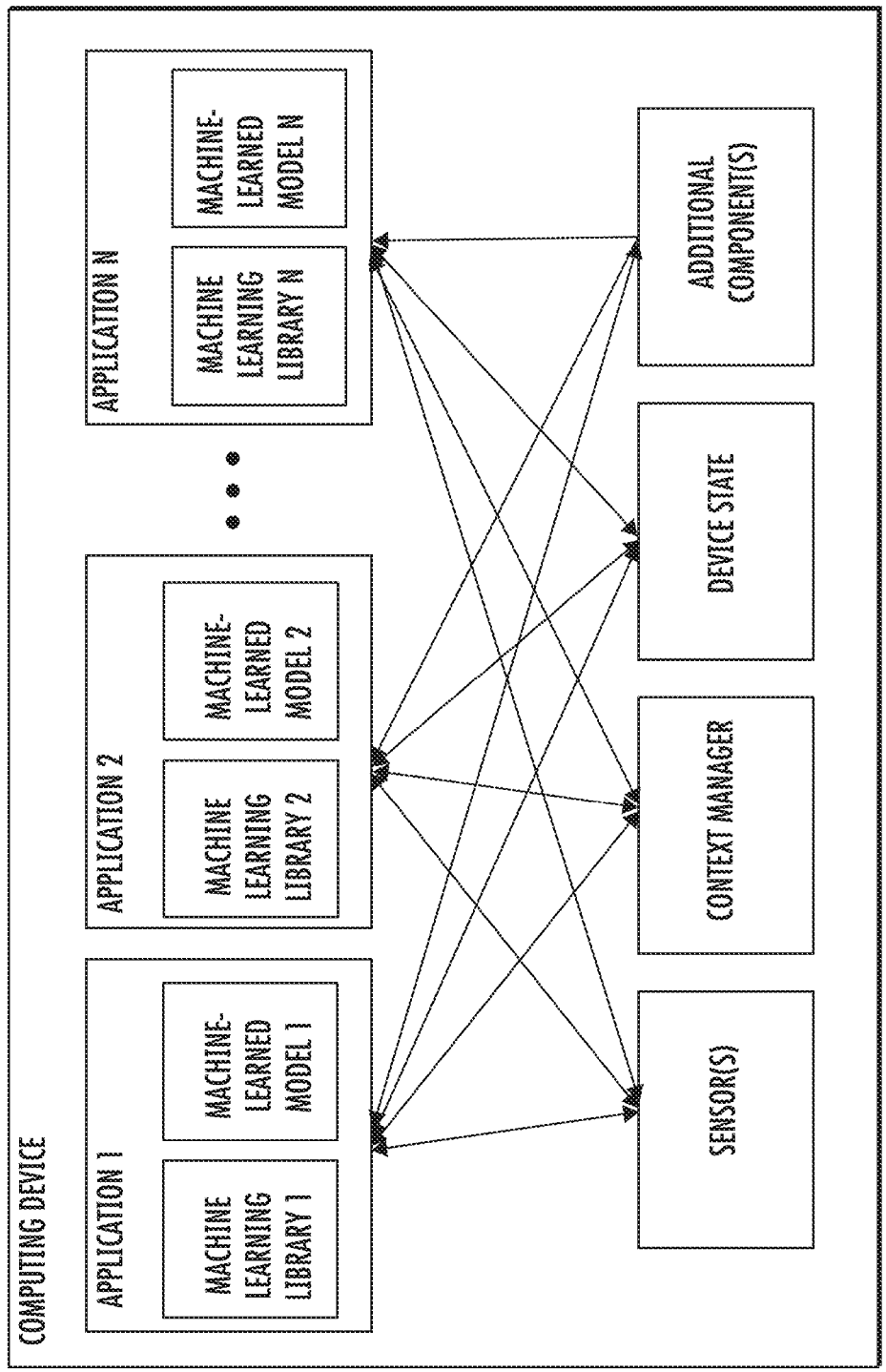
FIG. 1B depicts a block diagram of an example computing device that performs operations to automatically generate a report according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
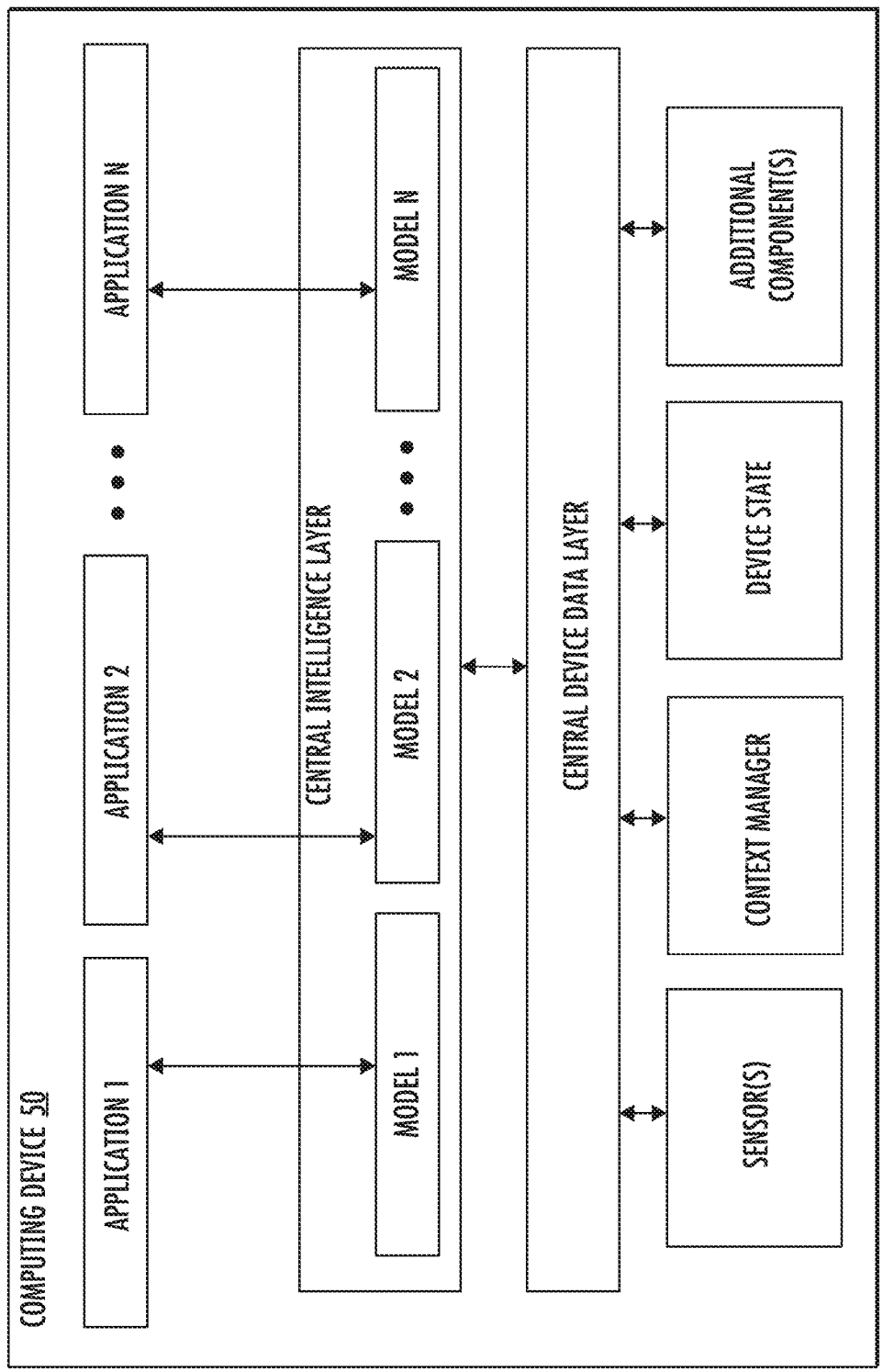
FIG. 1C depicts a block diagram of an example computing device that performs operations to automatically generate a report according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Prediction Model Arrangements

Figure 2:
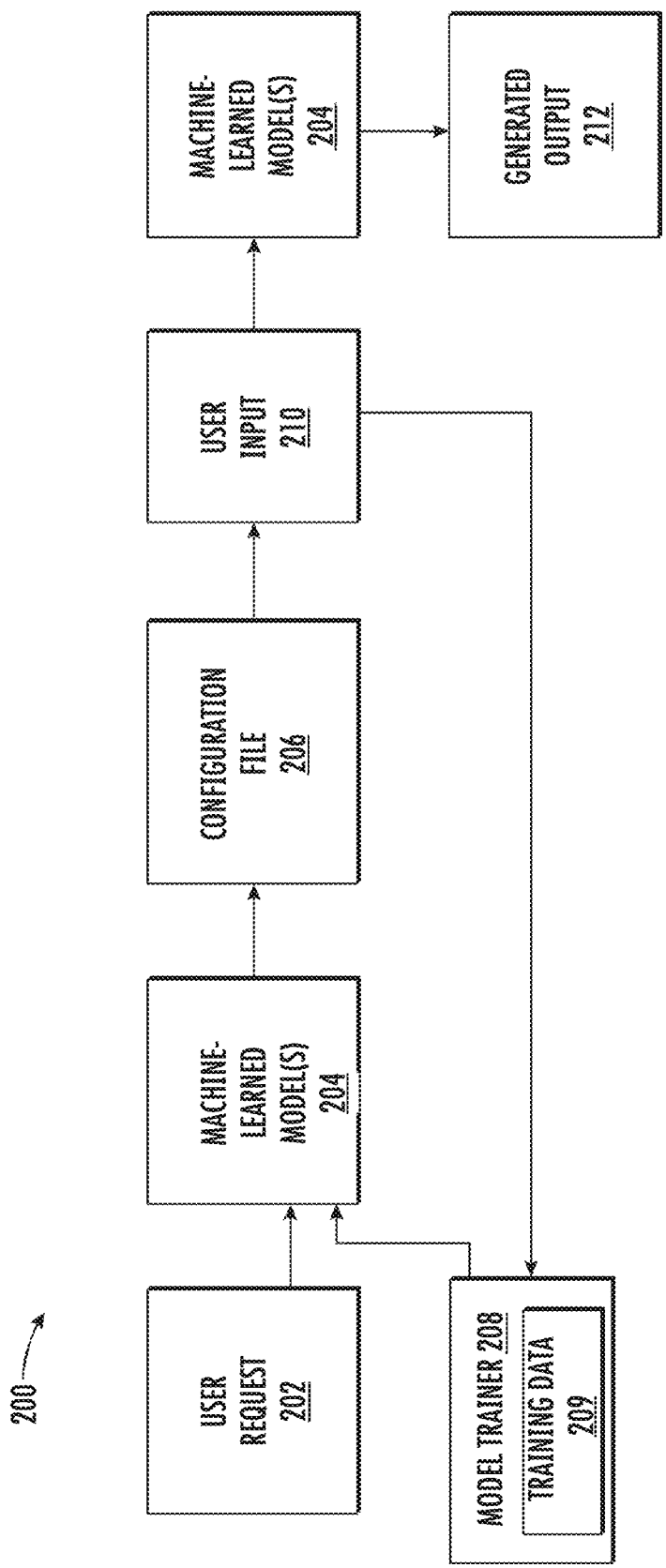
FIG. 2 depicts a block diagram of an example machine-learned model according to example embodiments of the present disclosure.

FIG. 2 depicts a block diagram of an example system 200 according to example embodiments of the present disclosure. In some implementations, the machine-learned model(s) 204 are trained to receive a user request 202 (e.g., query request) and determine (e.g., provide, output) a configuration file 206.

In some implementations, the computing system (user computing device 102, server computing device 130, training computing system 150, computing device 10, computing device 50) can process the user request 202 to determine (e.g., generate) one or more configuration file 206 using the example system 200 described in FIG. 2.

The user request 202 can be descriptive of a question received from a user in a natural language. As a result of obtaining the user request 202, the machine-learned model(s) 204 can determine a configuration file 206. In the reach estimation example, the configuration file 206 can include dimensions, measures, filters, and/or representations. The dimension can include dates, devices, countries, and so on. The measures can include impressions, reach, reach into certain demo categories, and so on. The filters can have restrictions of dimensions (e.g., restriction to a set of device types, time range). The representations can include line chart, pie chart, table, and so on.

In some instances, the machine-learned model(s) 204 can dynamically determine a configuration file 206 based on previous user interactions (e.g., user history) and/or based on the current context of the conversation with the user. In some instances, the machine-learned model(s) 204 can generate the configuration file 206 based on a prompt received. The prompt being generated by the language model based on the query request.

In some instances, the configuration file 206 for a data retrieval for a report can include: single dimension, or a list of dimensions which is interpreted as a full cross; single or multiple measures; none or multiple filters; ordering clauses; and or limiting clauses. The ordering clauses can include order by dimension, order by measures with a pointer to one of the chosen measures. The limiting clauses can refer to a choice to limit, with an integer number for the limit. The data retrieval can be of a specific dataset, and the configuration file 206 can be generated based on the specific dataset.

The configuration file 206 can be presented to a user on a user interface. Thus, in some implementations, the system 200 can include a machine-learned model(s) 204 that is operable to generate a configuration file. The model(s) can be a machined-learned model as described in FIGS. 1A-1C.

Additionally, the system 200 can present the configuration file 206 to a user interface. Subsequently, the system can receive user input 210 in response to the presentation of the configuration file 206. The user input 210 can modify and/or confirm the configuration file 206. The user input 210 can update the configuration file 206 by modifying a parameter of the dimensions, measures, filters, and/or representations of the configuration file 206. The user input 210 can also verify and confirm that the configuration file 206 is accurate.

Moreover, the system 200 can input the updated configuration file (e.g., configuration file 206 that is updated by the user input 210) into the machine-learned model(s) 204 to generate an output 212. The output can include a visual representation such as a line chart, pie chart, table, and so on, as illustrated in FIGS. 5-7.

Furthermore, the machine-learned model(s) 204 can be trained by the model trainer 208 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. The model trainer 160 in FIG. 1A can be an example of the model trainer 208 in the system 200.

In some implementations, the model trainer 208 can train the machine-learned model(s) 204 based on a set of training data 209. The training data 209 can include the training data 162 described in FIG. 1A. Additionally, the training data 209 can include, for example, user input 210. The user input 210 can include previously user interactions with configuration file 206 and/or generated output 212.

For example, in some embodiments, the machine-learned model(s) 204 can include a machine-learned model configured to receive a user request 202 and user input 210 and generate an output 212. For instance, the machine-learned model(s) 204 can include a transformer architecture (e.g., an encoder structure, a decoder structure, one or more self-attention heads, etc.). For instance, the machine-learned model(s) 204 can include a model configured to operate over one or more input embeddings to generate natural language outputs.

In some embodiments, the machine-learned model(s) 204 can be trained based on a training dataset containing a natural language corpus. Training can be conducted in an unsupervised fashion by, for a given natural language sequence (e.g., a word, a phrase), a corresponding configuration file can be automatically constructed based on the configuration of the datasets.

Example Methods

Figure 3:
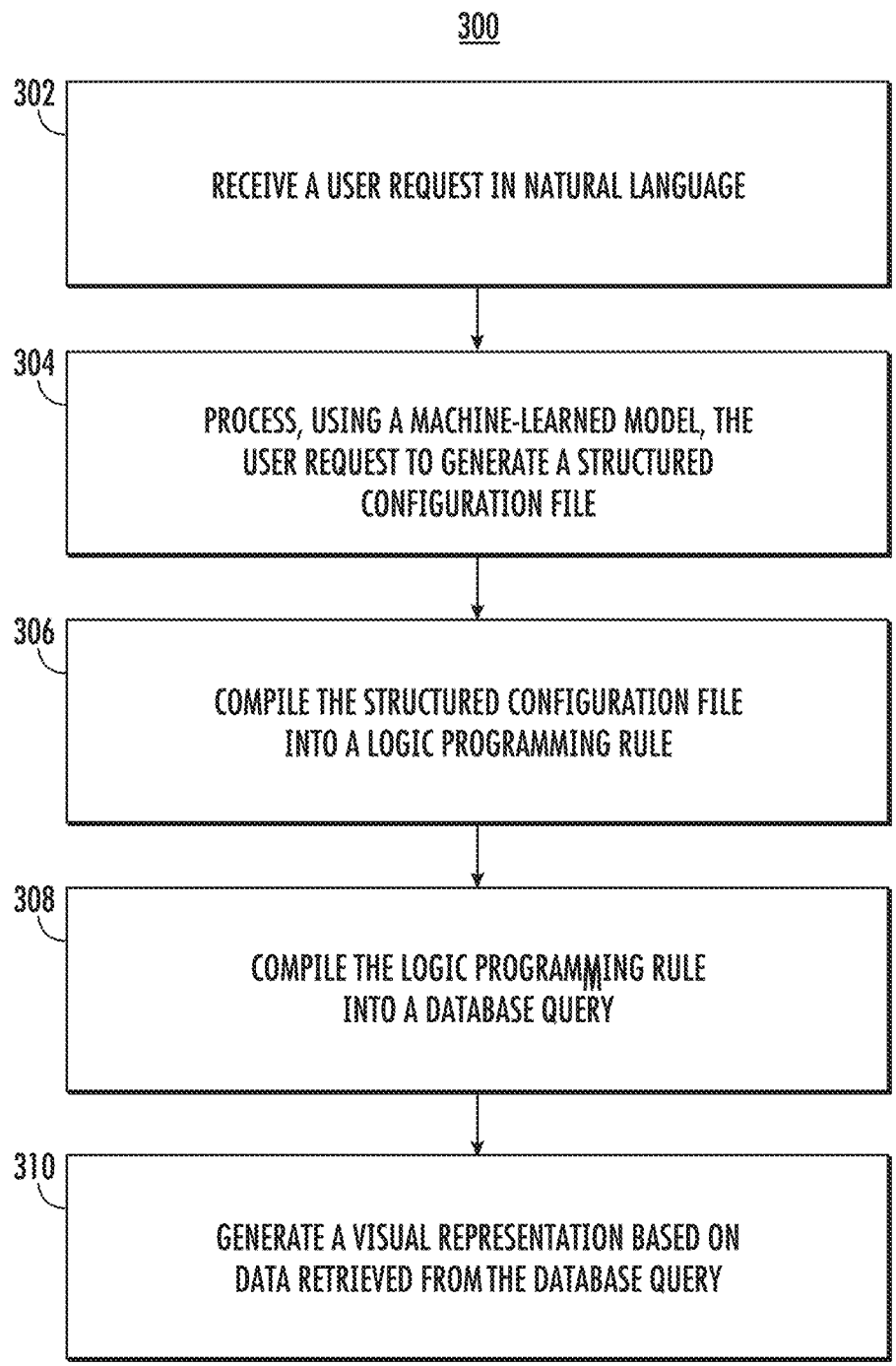
FIG. 3 depicts a flow chart diagram of an example method to automatically generate a report according to example embodiments of the present disclosure.

FIG. 3 depicts a flow chart diagram of an example method 300 to perform according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At 302, a computing system can receive a user request in natural language. For example, a user enters their question related to the data in natural language (e.g. "How many people did I reach on each device type in Brazil?").

At 304, the computing system can process, using a machine-learned model, the user request to generate a structured configuration file. In some instances, the question is compiled by LLM into a structured config formally specifying dimensions, measures and filters, data representation.

A structured config file is a type of configuration file that follows a specific format or syntax designed to provide a structured representation of configuration settings or parameters. Unlike plain text configuration files, which may have loose or ad-hoc formatting, structured config files enforce a predefined structure and organization of the configuration data. The purpose of using a structured config file is to improve readability, maintainability, and ease of parsing and processing by software tools or applications that consume the configuration data.

Structured config files often employ a syntax or markup language that defines rules and conventions for representing the configuration settings. Structured config files provide a well-defined structure, which facilitates easier validation, parsing, and manipulation of configuration data. They are often used in software applications, frameworks, and systems where complex or hierarchical configurations are required. Additionally, structured config files can support additional features like comments, data types, and inheritance, depending on the chosen format and any specific extensions or libraries used.

At 306, the computing system can compile the structured configuration file into a logic programming rule. The Configuration file can be naturally compiled via a conventional program into a logic programming rule. The system can convert a structured configuration file into a logic programming rule typically involving parsing the config file, extracting the relevant data, and transforming it into a format suitable for logic programming. The specific approach may vary depending on the programming language, tools, and frameworks used.

The system can parse the config file (e.g., configuration file) by using a parser or library that supports the syntax of the structured config file format (e.g., JSON, YAML, XML) to read and parse the file's contents. The system can extract the relevant settings or parameters that need to be transformed into logic programming rules. Additionally, the system can identify the necessary data and convert it into a suitable representation for logic programming. The system can define the logic programming rules that correspond to the extracted configurations. The rules can reflect the relationships, constraints, or behaviors specified by the configurations.

Additionally, the system can transform the configuration to logic rules by mapping the extracted configuration data to logic programming rules. The system can convert the configuration parameters into appropriate predicates, facts, or clauses according to the syntax and semantics of the logic programming language being used. The transformation process can depend on the specific requirements of your logic programming system.

Moreover, the system can integrate logic programming rules generated from the configurations into the conventional program by including them as part of the program's rule base or knowledge base. Subsequently, the system can execute the logic program, which now includes the integrated logic rules from the configuration file. The logic rules can be used to drive the behavior, perform queries, or make inferences based on the provided configurations. By transforming structured configurations into logic programming rules, the system can leverage the expressive power and reasoning capabilities of logic programming to handle dynamic or complex configurations. The system enables flexible configuration management, rule-based decision-making, and automated reasoning.

At 308, the computing system can compile the logic programming rule into a database query. The logic programming compiler can then compile the logical rule into a query to a relational database or data warehouse. Compiling logic programming rules into queries for a relational database can integrate the logic programming compiler with a database interface.

The system can define logic programming rules that capture the desired relationships, constraints, or behaviors that need to be queried against the relational database. The system can set up a database interface that enables communication between the logic programming system and the relational database.

Additionally, the system can connect to the database by establishing a connection to the relational database using the database interface. In some instances, the system can provide the appropriate credentials, connection details, and any other required configuration parameters to establish the connection successfully. The system can analyze the logic programming rules and map them to corresponding database queries that can be executed against the relational database. This mapping process involves translating the logical predicates, facts, and clauses into database statements that retrieve relevant data from the database tables.

Moreover, the system can user the logic programming compiler to compile the logic rules into executable code, and execute the compiled logic program, which includes the mapped database queries (e.g., SQL queries), by invoking the appropriate predicates or goals in the logic programming language. The logic programming system will internally trigger the execution of the associated database queries against the connected database.

Subsequently, the system can receive the results of the executed database queries from the database interface. The logic programming system can process and manipulate these results using the constructs provided by the language. This could involve filtering, transforming, or combining the data to derive the desired outcome.

At 310, the computing system can generate a visual representation based on data retrieved from the database query. The visual representations can include line charts, pie charts, tables, and other visuals.

Figure 4:
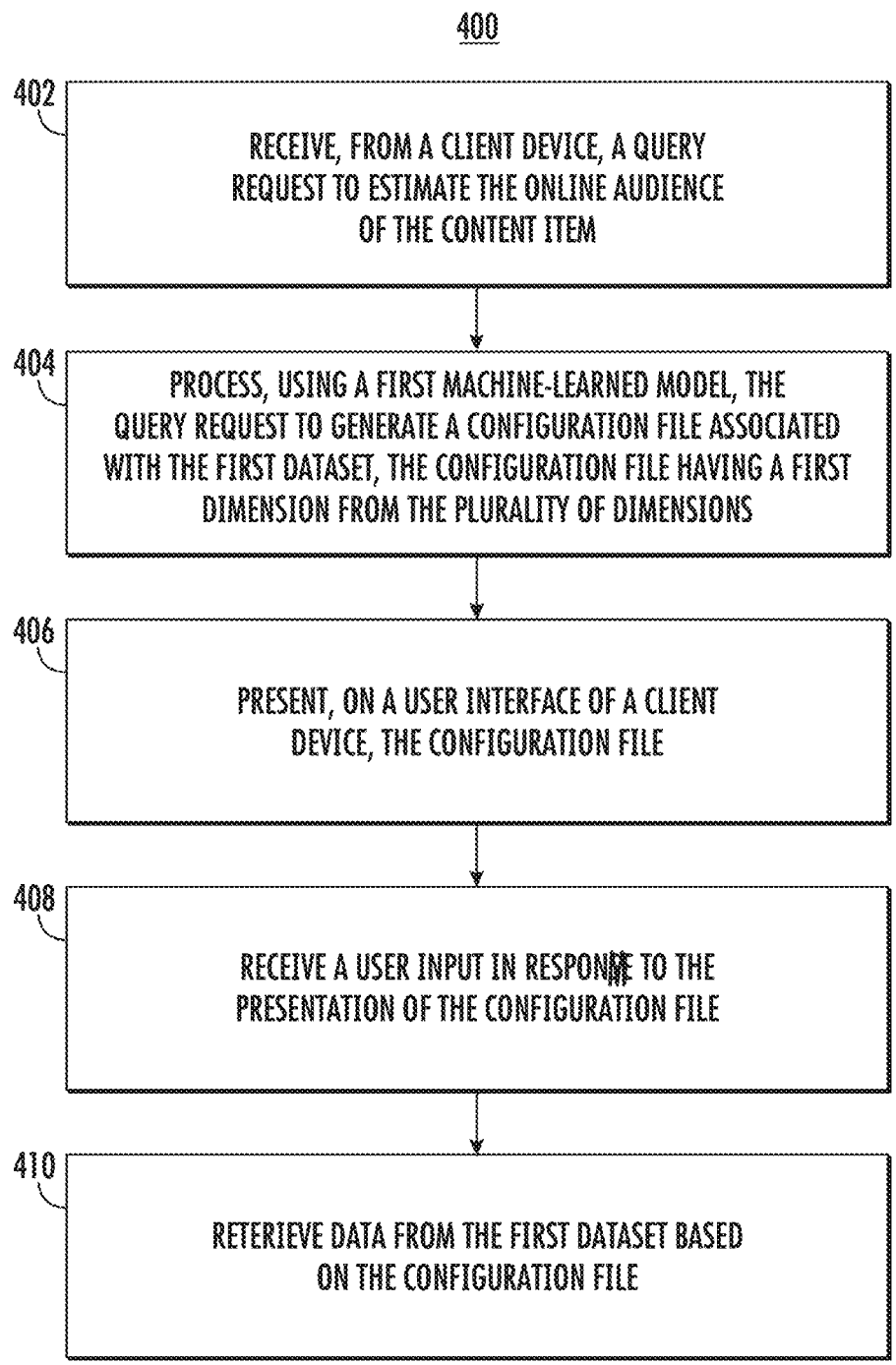
FIG. 4 depicts a flow chart diagram of an example method to automatically generate a report according to example embodiments of the present disclosure.

FIG. 4 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At 402, a computing system can receive, from a client device, a query request.

For example, at 402, the query request can be "how many users has the content item reached on each device type in Brazil?" The system can access a first dataset associated with events of users viewing the content item. The first dataset can include a table where each row is an event of the user seeing the content item once, and characteristics (country, device type, time of day, specific location within the country) associated with the event. Continuing with this example, at 404, the system can generate a structured configuration file to retrieve data from the first dataset with "Brazil" as a filter. Additionally, the configuration file can include device type as a dimension. At 406, the system can present the configuration file on a user interface. At 408, the user can confirm and/or modify the configuration file by providing a user input. Once the user confirms the configuration file, the system can filter the events in Brazil by device type, and reach can be the measurement. For every value of the dimension (e.g., device type), the system can determine (e.g., count) distinct users. Subsequently, the system can choose a preferred visual representation from a plurality of visual representation for the user request. Continuing with this example, at 410, the system can present a bar chart which illustrates the dimensions (e.g., different device type) and measure for every value of each dimension.

At 404, the computing system can process, using a machine-learned model, the query request to generate a configuration file, the configuration file having a first dimension. In some instances, the first dimension can be a date or a range of dates (e.g., the last 30 days). In some instances, the first dimension can be a device type. In some instances, the first dimension can be a country.

In some instances, with regards to reach, dimensions can be dates, devices, countries, and so on. Measures can be impressions, reach, reach into certain demo categories, and so on. Filters can include restrictions of dimensions (e.g., restriction to a set of device types, time range). The representations can be line charts, pie charts, tables, and so on. The computing system can specify logic predicates that define each dimension, measure, and filter.

In some instances, the structured configuration file can include a predicate associated with the first dimension and a measure. For example, the measure is an impression of a content item. In another example, the measure is a reach measurement associated with a content item.

At 406, the computing system can present, on a user interface of a client device, the configuration file.

In some instances, the configuration file can include a parameter associated with the first dimension, wherein the data retrieved from the first dataset is filtered based on the parameter associated with the first dimension.

At 408, the computing system can receive a user input in response to the presentation of the configuration file.

In one example, the user input can change the configuration file. In this example, the system can update the configuration file based on the user input. Additionally, the system can compile the updated configuration file into a logic programming rule. The logic programming rule can have a predicate. The predicate can be associated with the first dimension. Moreover, the system can compile the logic programming rule into a database query of the server. The report can be generated based on data retrieved from the first dataset using the database query. The data retrieved can be filtered based on the first dimension.

In one example, the user input can be a confirmation that the configuration file is accurate. In this example, the system can compile the configuration file into a logic programming rule, the logic programming rule having a predicate. The predicate can be associated with the first dimension. Additionally, the system can compile the logic programming rule into a database query of the server, wherein the report is generated based on data retrieved from the first dataset using the database query. Moreover, the data retrieved can be filtered based on the first dimension.

In some instances, the user input can change a parameter of the first dimension in the configuration file.

In some instances, the user input can change the first dimension in the configuration file to a second dimension.

At 410, the computing system can generate the report based on the configuration file and the user input. For example, FIGS. 5-7 illustrate example reports that can be generated at 410.

In some instances, the first machine-learned model being can be configured to process the configuration file to generate the report concurrently while presenting the configuration file on the user interface of the client device.

In some instances, the report can be a line chart, a pie chart, or a table.

In some instances, the server can include a plurality of datasets. The operations can include determining, using the first machine-learned model, to retrieve data from the first dataset in the plurality of dataset based on the query request.

In some instances, the computing system includes a plurality of machine-learned models. The operations can include selecting the first machine-learned model from the plurality of machine-learned models based on the query request. Additionally, the operations can include selecting a second machine-learned model from the plurality of machine-learned models based on the query request. Moreover, the operations can include generating, using the second machine-learned model, a second report based on the retrieved data. Furthermore, the operations can include presenting, on the user interface of the client device, a comparison of the report and the second report.

FIG. 5 illustrates a bar graph 500 as an example visual representation of the output. For example, the query request can be to obtain the reach and impression measurements in a first country by device type. Based on this request, the report generated can be bar graphs the depict the reach and impression measurements in a first country by device type. In some instances, the machine-learned model can determine that a bar graph is the preferred method of visually representing the output for this type of query request.

FIG. 6 illustrates a line graph 600 as an example visual representation of the output. For example, the query request can be to obtain reach measurements over a specific period of time. Based on this request, the report generated can be a line chart that depicts reach measurements over a period of time. In some instances, the machine-learned model can determine that a line chart is the preferred method of visually representing the output for this type of query request (e.g., measurement of a period of time).

FIG. 7 illustrates another line graph 700 as an example visual representation of the output. For example, the query request can be to obtain reach and impression measurements in a second country on a specific device type. Based on this request, the report generated can include a first line chart of the reach measurement in the second country on the specific device over a specific period of time. The report can also include a second line chart of the impression measurement in the second country on the specific device over the same specific period of time. In some instances, the machine-learned model can determine that presenting two line charts is the preferred method of visually representing the output for this type of query request.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system configured to generate a report estimating an online audience of a content item, the computing system comprising:
    one or more processors; and
    a server having a first dataset, the first dataset having a plurality of dimensions;
    one or more computer-readable media that store computer-readable instructions that, when executed by the one or more processors, cause the computing system to perform operations, the operations comprising:
        receiving, from a client device, a query request to estimate the online audience of the content item;
        processing, using a first machine-learned model, the query request to generate a configuration file associated with the first dataset, the configuration file having a first dimension from the plurality of dimensions;
        presenting, on a user interface of the client device, the configuration file;
        processing, using the first machine-learned model, the configuration file to generate the report concurrently while presenting the configuration file on the user interface of the client device;
        receiving a user input in response to the presentation of the configuration file;
        retrieving data from the first dataset based on the configuration file and the user input; and
        generating, using the first machine-learned model, the report based on the retrieved data from the first dataset.

2. The computing system of claim 1, wherein the user input changes the configuration file, the operations further comprising:
   updating the configuration file based on the user input;
   compiling the updated configuration file into a logic programming rule, the logic programming rule having a predicate, the predicate being associated with the first dimension; and
   compiling the logic programming rule into a database query of the server, wherein the report is generated based on data retrieved from the first dataset using the database query, and wherein the data retrieved is filtered based on the first dimension.

3. The computing system of claim 2, wherein the user input changes a parameter of the first dimension in the configuration file.

4. The computing system of claim 1, wherein the user input changes the first dimension in the configuration file to a second dimension.

5. The computing system of claim 1, wherein the user input is a confirmation that the configuration file is accurate, the operations further comprising:
   compiling the configuration file into a logic programming rule, the logic programming rule having a predicate, the predicate being associated with the first dimension; and
   compiling the logic programming rule into a database query of the server, wherein the report is generated based on data retrieved from the first dataset using the database query.

6. The computing system of claim 5, wherein the data retrieved is filtered based on the first dimension.

7. The computing system of claim 1, wherein the first dimension is a date.

8. The computing system of claim 1, wherein the first dimension is a device type.

9. The computing system of claim 1, wherein the first dimension is a country.

10. The computing system of claim 1, wherein the configuration file includes a predicate associated with the first dimension and a measure.

11. The computing system of claim 10, wherein the measure is an impression of a content item.

12. The computing system of claim 10, wherein the measure is a reach associated with a content item.

13. The computing system of claim 1, wherein the report is a line chart, a pie chart, or a table.

14. The computing system of claim 1, wherein the server includes a plurality of datasets, the operations further comprising:
   determining, using the first machine-learned model, to retrieve data from the first dataset in the plurality of dataset based on the query request.

15. The computing system of claim 1, wherein the computing system includes a plurality of machine-learned models, the operations further comprising:
   selecting the first machine-learned model from the plurality of machine-learned models based on the query request.

16. The computing system of claim 15, the operations further comprising:
   selecting a second machine-learned model from the plurality of machine-learned models based on the query request;
   generating, using the second machine-learned model, a second report based on the retrieved data; and
   presenting, on the user interface of the client device, a comparison of the report and the second report.

17. The computing system of claim 1, wherein the configuration file includes a parameter associated with the first dimension, wherein the data retrieved from the first dataset is filtered based on the parameter associated with the first dimension.

18. The computing system of claim 1, wherein the configuration file is different based on different datasets.

19. A computer-implemented method for generating a report, the method comprising:
   receiving, by one or more computing devices, a query request from a client device;
   processing, using a first machine-learned model, the query request to generate a configuration file associated with a first dataset, the configuration file having a first dimension from a plurality of dimensions;
   presenting, on a user interface of the client device, the configuration file;
   processing, using the first machine-learned model, the configuration file to generate the report concurrently while presenting the configuration file on the user interface of the client device;
   receiving a user input in response to the presentation of the configuration file;
   retrieving data from the first dataset based on the configuration file and the user input; and
   generating, using the first machine-learned model, the report based on the retrieved data from the first dataset.

20. One or more non-transitory computer-readable media comprising instructions that when executed by one or more computing devices cause the one or more computing devices to perform operations comprising:
   receiving a query request from a client device;
   processing, using a first machine-learned model, the query request to generate a configuration file associated with a first dataset, the configuration file having a first dimension from a plurality of dimensions;
   presenting, on a user interface of the client device, the configuration file;
   processing, using the first machine-learned model, the configuration file to generate the report concurrently while presenting the configuration file on the user interface of the client device;
   receiving a user input in response to the presentation of the configuration file;
   retrieving data from the first dataset based on the configuration file and the user input; and
   generating, using the first machine-learned model, a report based on the retrieved data from the first dataset.

* * * * *